United States Patent [19]
Smith, III et al.

[11] Patent Number: 5,957,798
[45] Date of Patent: Sep. 28, 1999

[54] FAIL-FREE ACTUATOR ASSEMBLY

[75] Inventors: Reese R. Smith, III, Succasunna, N.J.; Eugene E. Shube, Elmont, N.Y.

[73] Assignee: GEC-Marconi Aerospace Inc., Whippany, N.J.

[21] Appl. No.: 09/122,385

[22] Filed: Jul. 24, 1998

Related U.S. Application Data

[60] Provisional application No. 60/058,412, Sep. 10, 1997.

[51] Int. Cl.[6] .................................................. F16M 37/08
[52] U.S. Cl. ........................... 475/5; 74/665 B; 74/89.15
[58] Field of Search .................... 475/1, 5, 150; 74/89.15, 665 B

[56] References Cited

U.S. PATENT DOCUMENTS

| | | | |
|---|---|---|---|
| 4,858,491 | 8/1989 | Shube ........................................ | 74/665 |
| 5,329,657 | 7/1994 | Bartley et al. ..................... | 74/89.15 X |
| 5,628,234 | 5/1997 | Crook et al. .............................. | 74/665 |

*Primary Examiner*—Khoi Q. Ta
*Attorney, Agent, or Firm*—Fish & Neave; Robert R. Jackson; Martin A. Leroy

[57] ABSTRACT

An electromechanical actuator is disclosed having either a rotary output or a linear output for moving an external load, the actuator having at least two drive motors, a synchronizer connected to the outputs of the drive motors, a differential mechanism combining the outputs of the drive motors, and a quick release mechanism connected to the differential mechanism and the actuator output, the quick release mechanism releasing support of the external actuator load in response to an internal actuator jam and maintaining support or the external actuator load in response to an external actuator overload.

14 Claims, 14 Drawing Sheets

FAIL-FREE ACTUATOR ASSEMBLY

This application claims the benefit of U.S. provisional application Ser. No. 60/058,412, filed Sep. 10, 1997.

BACKGROUND OF THE INVENTION

This invention relates to electro-mechanical actuators, and more particularly, electro-mechanical actuators which release their loads in the event of an internal actuator failure or jam, and maintain their loads in the event of an external overload or jam. A jam refers to any failure causing an excess torque to occur in the actuator mechanism, whether the failure is internal or external to the actuator.

Prior art fail-free actuators for use in various critical applications including movement of aircraft control surfaces are constructed so that internal failure in the actuator itself does not prevent a separate backup actuator from governing the same load. Prior art fail-free actuators experiencing internal jams release their loads, failing-free, so that they do not cause an external overload on a backup actuator connected to the same load. However, many prior art fail-free actuators also release their external load in response to external overload situations, which may be an undesirable characteristic for some applications. In addition, many prior art fail-free actuators incorporate quick release mechanisms that are not easily reassembled or reversed after a quick release occurs. For example, some prior art quick release mechanisms use movable pins and rollers to couple the actuator output member to the actuator drive system. In response to a jam, the pins and rollers move into positions that require actuator maintenance to reset the quick release mechanism in order to restore functionality to the actuator. As a result, testing of the "fail-free mode" in prior art actuators is difficult.

In view of the foregoing, it is an object of this invention to improve and simplify rotary output and linear output, fail-free, electro-mechanical actuators.

It is a further object of this invention to enable simplified testing of a fail-free actuator by incorporating a reversible quick release mechanism.

SUMMARY OF THE INVENTION

These and other objects of the invention are accomplished in accordance with the principles of the invention by providing an electromechanical actuator having either a rotary output or a linear output for moving an external load, the actuator having at least two drive motors, a synchronizer connected to the outputs of the drive motors, a differential mechanism combining the outputs of the drive motors, and a quick release mechanism connected to the differential mechanism and the actuator output, the quick release mechanism releasing support of the external actuator load in response to an internal actuator jam and maintaining support of the external actuator load in response to an external actuator overload.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
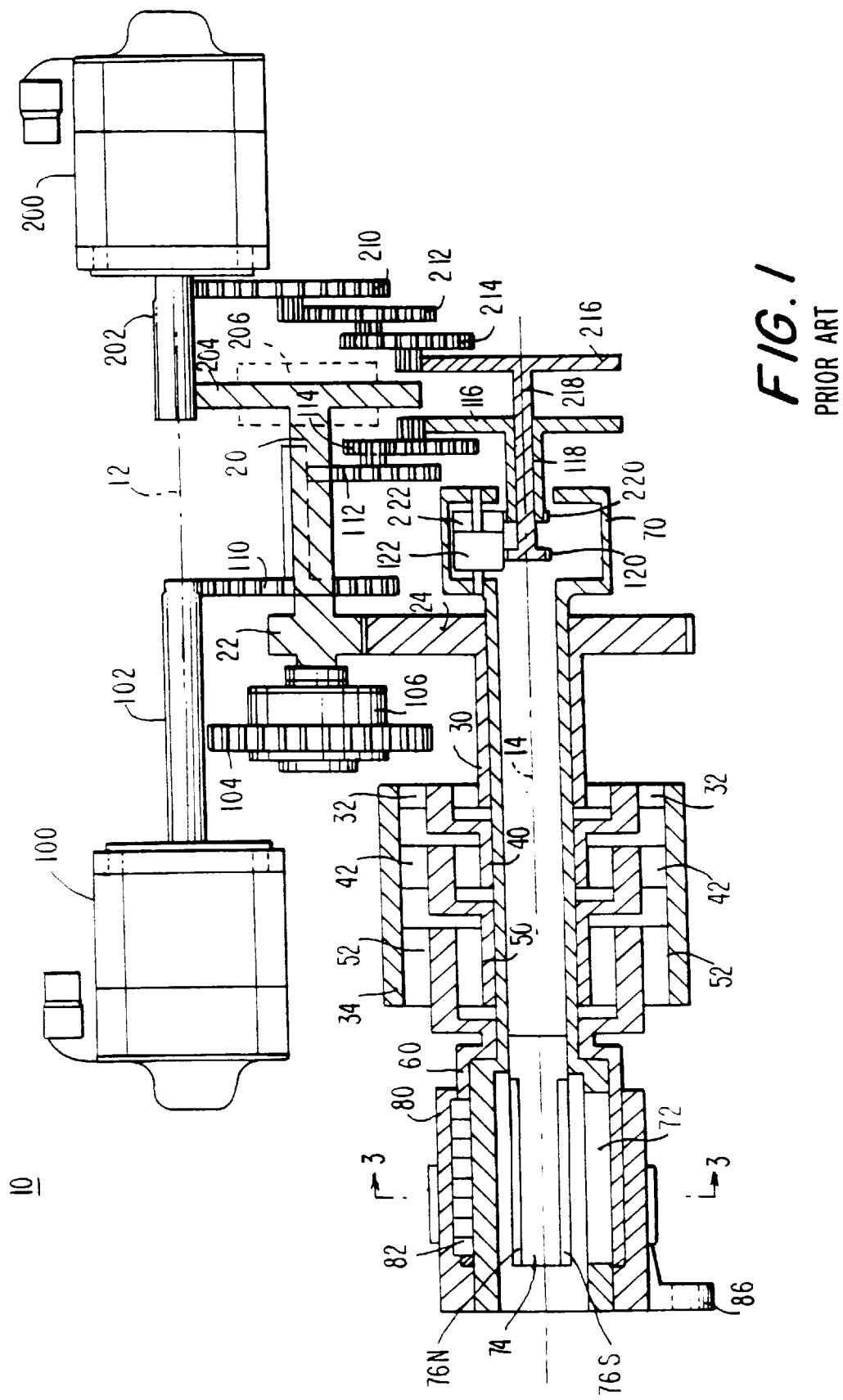
FIG. 1 is a schematic drawing of the prior art rotary fail-free actuator of U.S. Pat. No. 5,628,234.

Typical prior art fail-free actuators use multiple drive motors and directly linked outputs that require the use of at least one torque limiter in the transmission path of one of the drive motors to implement the fail-free mode. Fail-free mode causes the actuator to release its load by disassociating the actuator drive mechanism from the actuator output member. Referring to FIG. 1, a schematic drawing of the prior art rotary fail-free actuator described in U.S. Pat. No. 5,628,234 (which is hereby incorporated by reference herein), the output of drive motor 100 and the output of drive motor 200 are directly linked at drive shaft 20. Clutch 106, interposed between drive motor 100 and shaft 20, is a torque limiter. Items 30, 40, 50, 32, 42, 52 and 34 are components of a multilevel sun-planet-ring gear system that transmits the combined output of drive motors 100 and 200 to sleeve 60. Sleeve 60 transmits rotation to a coupler. The coupler includes rollers 82, an extension of differential housing 70, magnet 74 and output sleeve 80. Output sleeve 80 is connected to actuator output arm 86. Drive motors 100 and 200 are connected to a differential monitor through gear trains 110-112-114-116 and 210-212-214-216, respectively.

A torque overload across clutch 106 causes clutch 106 to release and disassociate the output of drive motor 100 from the output of drive motor 200. Torque overloads may result from an internal jam in drive motor 100 or drive motor 200, an internal jam in the transmission (e.g., the sun-planet-ring gear system) between output arm 86 and clutch 106, or an external overload or an external jam caused by an external load that exceeds the maximum operating load for the actuator. Because at least one torque limiter is placed directly in the transmission path of at least one of the drive motors, the actuator releases its load during both an external jam and an internal jam.

Under normal operating conditions, gears 116 and 216 rotate at the same speed, and housing 70 of the differential monitor rotates at the same speed as sleeve 60, the output of the sun-planet-ring gear system. In the event of an internal jam or an external overload, clutch 106 releases, permitting gears 116 and 216 to rotate at different speeds, which causes differential housing 70 to rotate at a different speed than sleeve 60.

Figure 2:
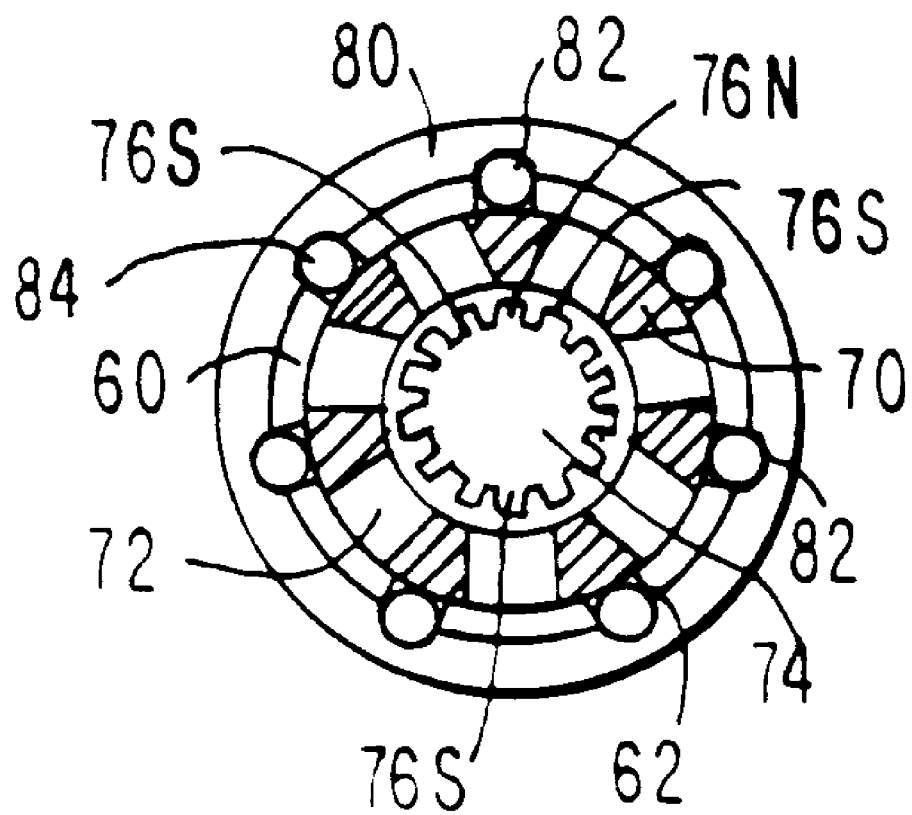
FIG. 2 is a simplified sectional view of FIG. 1 showing the coupler of the prior art device of FIG. 1.

Referring to FIG. 2, a simplified sectional view of FIG. 1 showing the coupler of the prior art device of FIG. 1, differential housing extension 70 holds rollers 82 in slots 84 when extension 70 rotates at the same speed as sleeve 60. If extension 70 and sleeve 60 change speed relative to each other, rollers 82 are drawn into channel 72 by magnet 74, disassociating output sleeve 80 (and output arm 86) from sleeve 60. Rollers 82 in this prior art device are not easily returned to their normal operating positions without actuator maintenance. Thus, testing of the fail-free mode in this prior art device is difficult.

Figure 3:
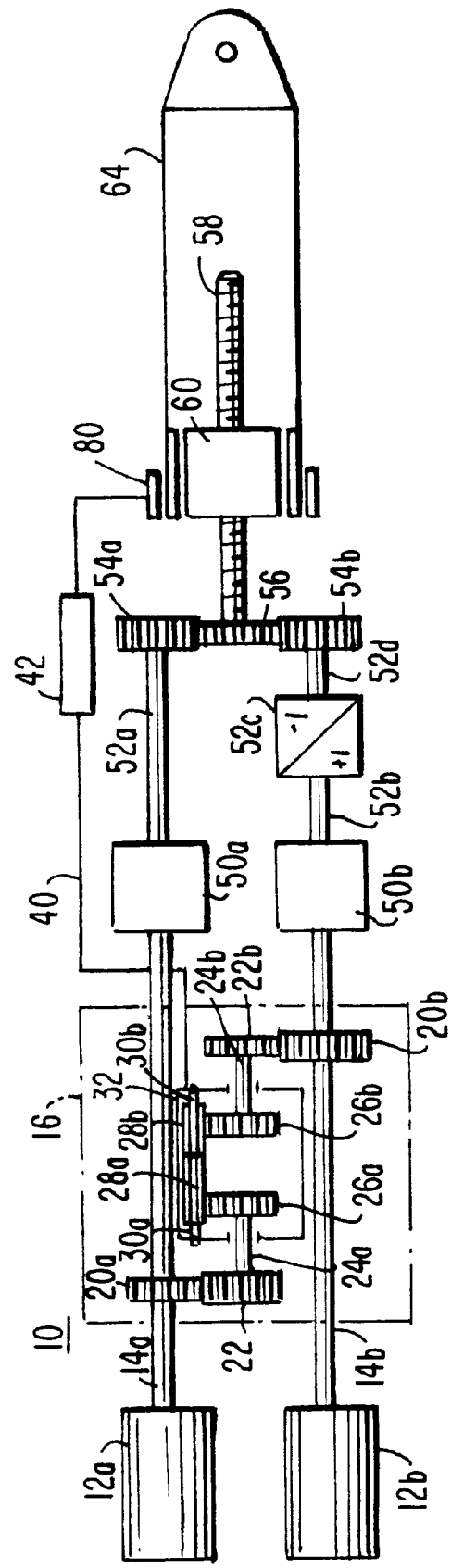
FIG. 3 is a schematic drawing of the prior art linear fail-free actuator of U.S. Pat. No. 4,858,491.

FIG. 3 is a schematic drawing of the prior art linear fail-free actuator described in U.S. Pat. No. 4,858,491 (which is hereby incorporated by reference herein). As with the prior art device of FIGS. 1 and 2, the prior art device of FIG. 3 enters fail-free mode in response to external overloads and internal jams through use of a torque limiter, a differential monitor and a coupler. The rotational outputs from motors 12a and 12b are directly combined in gear 56 on screw 58 (referred to as threaded shaft 58 in U.S. Pat. No. 4,858,491). Screw 58 interacts with nut 60 (referred to as collar 60 in U.S. Pat. No. 4,858,491) to transmit linear motion to actuator output bracket 64. Torque limiters 50a and 50b are placed directly in the transmission paths of motors 12a and 12b, respectively. Differential monitor device 16 has housing 32 that rotates if there is a difference in the rotational speeds of the outputs of motors 12a and 12b.

Figure 4:
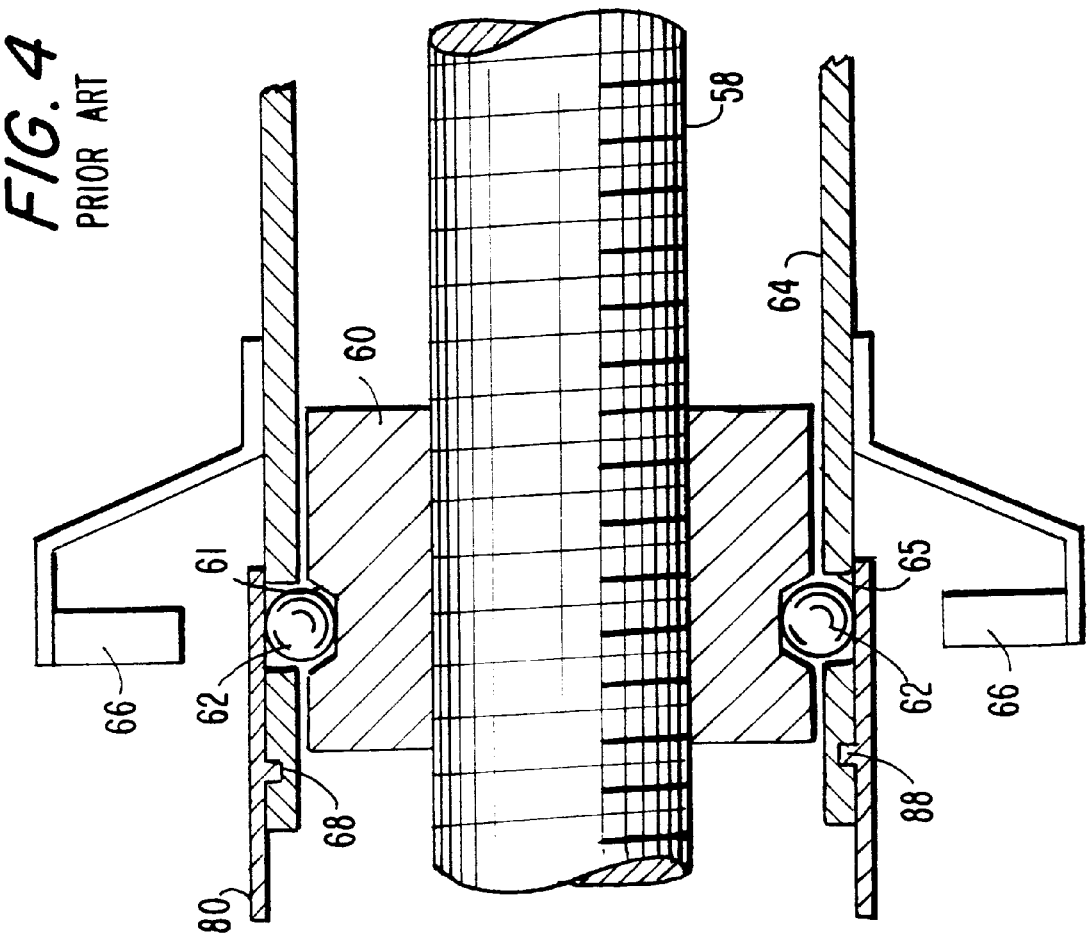
FIG. 4 is a simplified longitudinal section of the coupler portion of the prior art device of FIG. 3.

FIG. 4, is a simplified longitudinal section of the coupler portion of the prior art device depicted in FIG. 3. Housing 32 (shown in FIG. 3) is operatively connected to quick release actuator 80. During normal operation, motor outputs 14a and 14b (shown in FIG. 3) rotate at the same speed, and quick release actuator 80 holds balls 62 in place between nut 60 and actuator output bracket 64. Referring to FIGS. 3 and 4, in fail-free mode, either torque limiter 50a or 50b releases due to excessive torque resulting from an internal jam or an external overload, permitting motor outputs 14a and 14b to rotate at different speeds. Differential monitor 16 detects the difference in speed between the drive motor outputs and rotates housing 32 so that balls 62 are drawn by magnet 66 away from nut 60. As a result, actuator output bracket 64 is disassociated from nut 60 and the actuator load is released. In fail-free mode, balls 62 cannot be easily returned to their initial positions between nut 60 and actuator output bracket 64 without actuator maintenance. Thus, resetting the actuator after testing its fail-free functionality is difficult.

Figure 5:
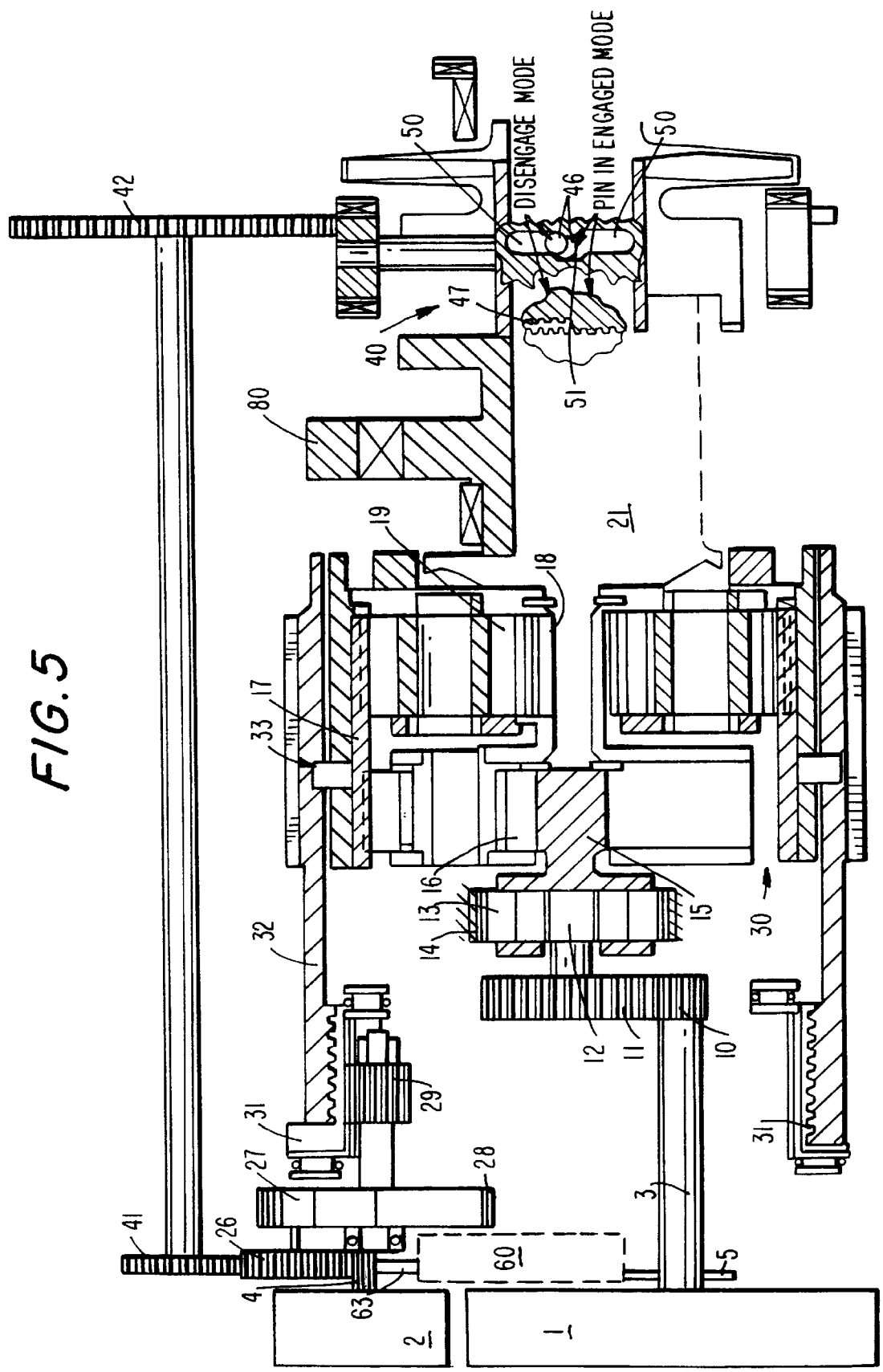
FIG. 5 is a schematic drawing of an illustrative embodiment of a rotary fail-free actuator of the present invention.

FIG. 5 is a schematic drawing of one embodiment of the present invention. This particular embodiment produces a rotary output. The actuator includes two separate drive motors and a quick release mechanism. The drive motors transmit rotation to a differential transmission that produces a combined rotary output. The quick release mechanism acts upon an engagement shaft so that the shaft is engaged with an actuator output arm during normal operation and disengaged from the output arm during an internal actuator jam.

Drive motors 1 and 2 are electrical motors that may operate at different speeds during normal operation of the actuator. Output shaft 3 of drive motor 1 is connected to pinion gear 10 which meshes with gear 11. Gear 11 drives sun gear 12, the sun gear in a first stage of a multistage sun-planet-ring gear system 30. Sun gear 12 drives planet gears 13 inside ring 14. Planet gears 13 drive sun gear 15, the sun gear in a second stage of multistage sun-planet-ring gear system 30. Sun gear 15 drives planet gears 16 inside ring 17. Planet gears 16 drive sun gear 18, the sun gear in a third stage of multistage sun-planet-ring gear system 30. Sun gear 18 drives planet gears 19 inside ring 17, the same ring that is a part of the second stage of system 30. Planet gears 19 drive power shaft 21.

Output shaft 4 of drive motor 2 meshes with gear 26 which is connected to gear 27. Gear 27 meshes with internal gear 28 which is connected to pinion gear 29 which drives screw 31. Screw 31 imparts axial motion to nut 32 which in turn imparts rotary motion to ring 17 through barrel cam arrangement 33 which may comprise a pin and slot mechanism. In this manner, the rotary outputs of drive motors 1 and 2 are indirectly combined by virtue of this differential planetary gear system to produce a single output at power shaft 21. Gear 41 meshes with gear 26 and transmits rotation to ring drive gear 42.

The selection of gear ratios in the transmission paths connecting drive motors 1 and 2 to the external load is such that drive motors 1 and 2 bear proportions of the external load causing them to cease rotation simultaneously in response to an external overload on the actuator. As is discussed in more detail below, it is important that both motors continue rotating as they encounter an external overload so that the quick release mechanism of the present invention does not cause the actuator to enter fail-free mode. Drive motors 1 and 2 themselves may have different torque-speed operating parameters requiring torque to be transferred from one motor drive path to the other motor drive path. The present invention uses a synchronizer 60 placed between the rotary outputs 3 and 4 of drive motors 1 and 2 to eliminate the effects of slightly different torque-speed operating parameters between drive motors 1 and 2. Synchronizer 60 ensures that an external overload will not force one motor to stop while the other motor has sufficient torque to continue rotating.

Figure 6:
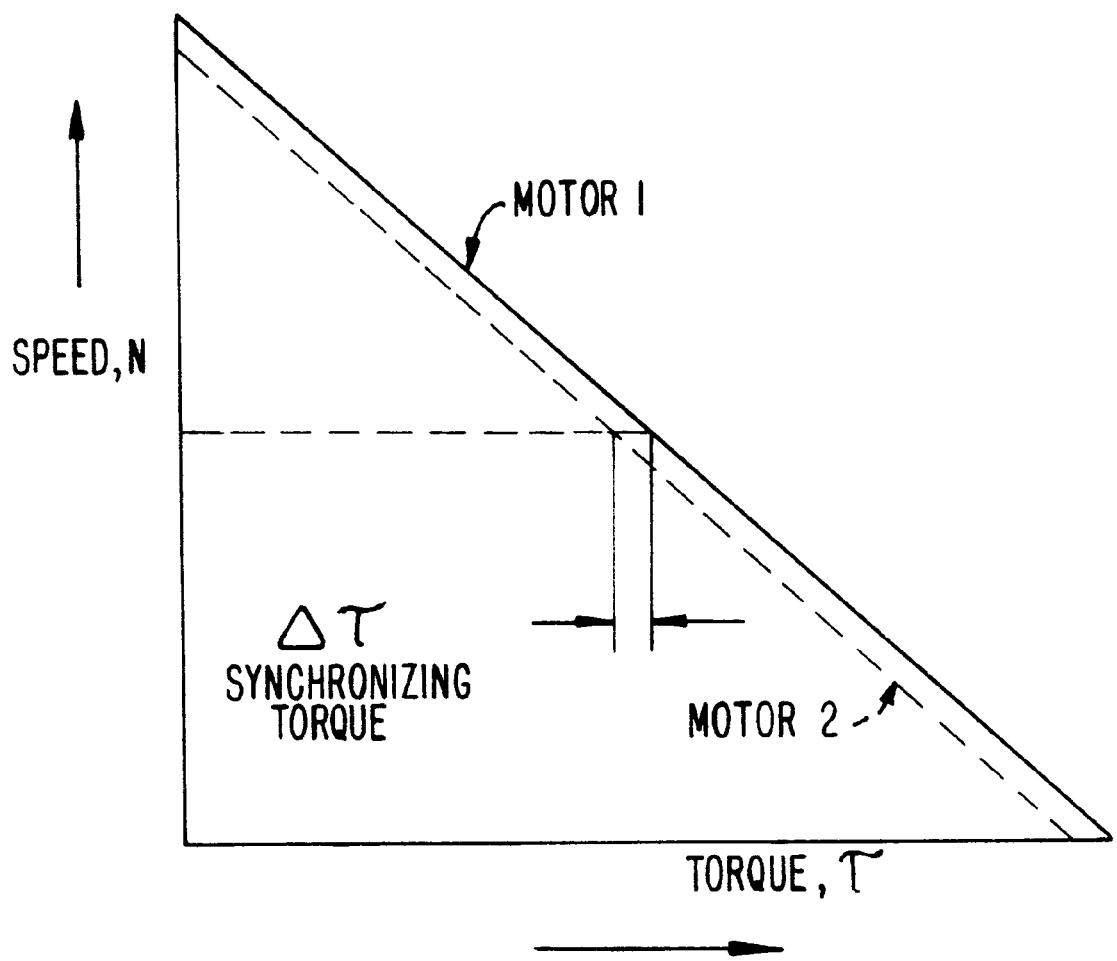
FIG. 6 is a graphical representation of the torque transferred by an illustrative synchronizer of the present invention.

FIG. 6 is a graphical representation of the torque transferred by synchronizer 60 (not shown in detail in FIG. 5) of the present invention such that the proportional torque loading described above is maintained across the two drive paths of drive motors 1 and 2. More specifically, synchronizer 60 maintains the proportional torque loading across output shafts 3 and 4 during normal operation so that output shafts 3 and 4 rotate at rates that form a fixed ratio when drive motors 1 and 2 are rotating.

Figure 7:
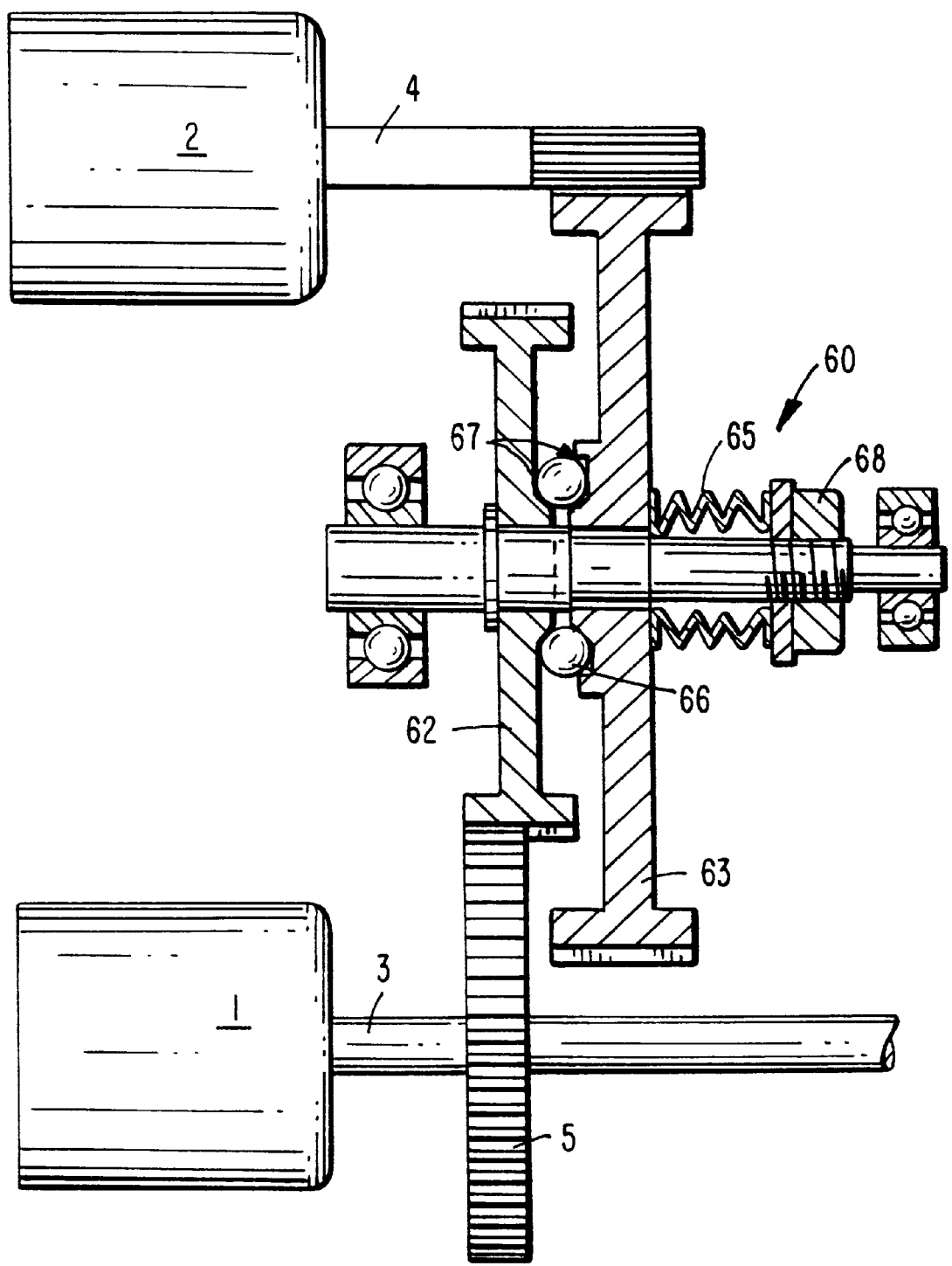
FIG. 7 is a detailed schematic drawing of an illustrative synchronizer of the device shown in FIG. 5.

FIG. 7 is a detailed schematic drawing of synchronizer 60 shown in FIG. 5. Referring to FIG. 7, synchronizer 60, a clutch release mechanism, includes gears 62 and 63 that connect to gear 5 and output shaft 41 respectively. During normal actuator operation, balls 66 reside in pockets 67 located between gears 62 and 63. Spring 65 applies a force against gear 63 to bind gear 63 against gear 62 so that gears 62 and 63 rotate in unison. Adjusting nut 68 may be used to determine the amount of torque that may be transferred between gears 62 and 63 before clutch release. The threshold torque level must be set low enough such that an internal actuator jam in the motor drive paths would cause gears 62 and 63 to separate permitting the quick release mechanism (described below) to cause the actuator to enter fail-free mode. The threshold torque level must also be set high enough so that the proportional torque loading is maintained across output shafts 3 and 4 during normal operation and during an external overload on the actuator. In the alternative, synchronizer 60 may comprise any clutch release mechanism that maintains a synchronized phase relationship during normal operation and that has the appropriate torque threshold.

Figure 8:
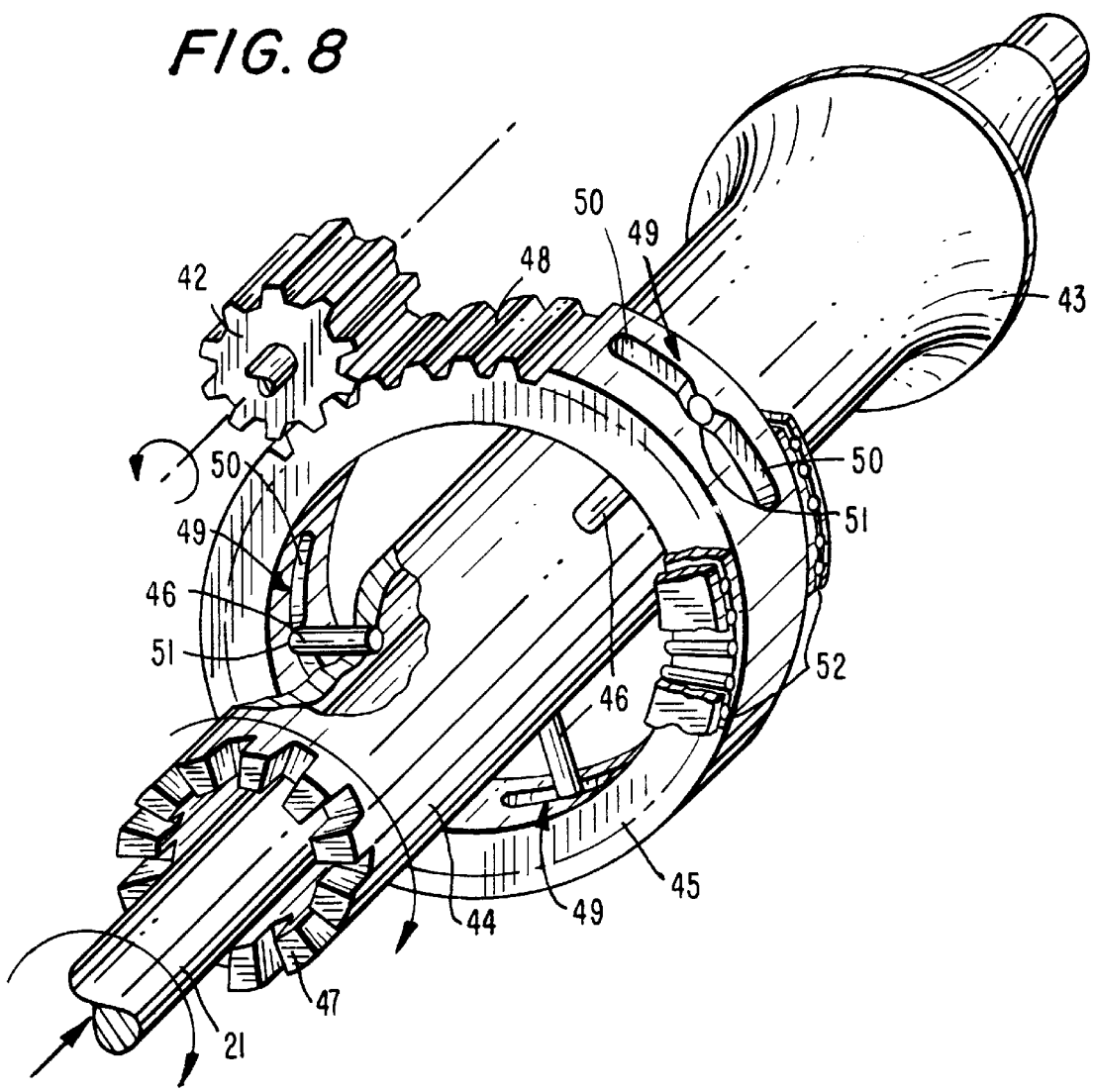
FIG. 8 is a perspective view of an illustrative quick release mechanism of the device shown in FIG. 5.

FIG. 8 is a perspective view of rotary quick release mechanism 40 shown in FIG. 5. Referring to FIG. 8, power shaft 21 is coupled to engagement shaft 44 through diaphragm coupling 43. Diaphragm coupling 43 is axially flexible and rotationally rigid so that power shaft 21 transmits rotation to engagement shaft 44, and engagement shaft 44 may be displaced in the axial direction independent of power shaft 21. Pins 46 are fixed to engagement shaft 44 and act as an axial shifter for engagement shaft 44. Engagement shaft 44 is coaxial with power shaft 21 and terminates at a face spline 47. Face spline 47 engages actuator arm 80 (not shown in FIG. 8). Actuator arm 80 is connected to the external actuator load.

Ring 45 and pins 46 comprise an engagement shaft axial positioning mechanism. Ring 45 is axially secured to the base of the actuator through thrust bearings 52. Ring 45 has external teeth 48 that cooperate with ring drive gear 42. Slots 49 in ring 45 act as an axial governor which interacts with the axial shifter to govern the axial position of engagement shaft 44. Each slot 49 has two wing sections 50 and a cusp section 51. When pins 46 are positioned in cusp sections 51, engagement shaft 44 engages actuator arm 80 (not shown in FIG. 8) to drive the external actuator load. When pins 46 are positioned in one of the wing sections 50 of slots 49, engagement shaft 44 is disconnected from actuator arm 80 and the actuator enters fail-free mode.

Referring back to FIG. 5, the upper portion of quick release mechanism 40 is shown when pins 46 are in the disengaged mode (one of pins 46 is visible in wing section 50). The upper portion of quick release mechanism 40 shows face spline 47 in the corresponding disengaged mode. For exemplary purposes, the lower portion of quick release mechanism 40 is shown when pins 46 are in the engaged mode (one of pins 46 is visible in cusp section 51). The lower portion of quick release mechanism 40 shows face spline 47 in the corresponding engaged mode.

Referring to FIGS. 5 and 8, the outputs of drive motors 1 and 2 are combined in a differential gear system 30 having a single power output, power shaft 21. Power shaft 21 drives engagement shaft 44 which drives actuator arm 80. Ring drive gear 42 transmits rotation from output shaft 4 of motor 2 to ring 45 of rotary quick release mechanism 40. During normal operation, ring 45 maintains a fixed angular relationship with engagement shaft 44 by rotating at the same angular velocity as engagement shaft 44 such that pins 46 remain in cusp sections 51 of slots 49. Thus, during normal operation, engagement shaft 44 remains engaged to actuator arm 80.

In the fail-free mode of operation, an internal jam in the actuator causes a torque across gears 62 and 63 in synchronizer 60 to exceed the predetermined threshold set by adjusting nut 68. Gears 62 and 63 break free of each other permitting output shafts 3 and 4 to rotate independently of one another. At least one output shaft changes speed as a result of the jam, and output shafts 3 and 4 no longer maintain the fixed ratio of rates of rotation that is present during normal operation. Rotation from output shaft 4 is transmitted to ring 45 and the combined outputs from motors 1 and 2 are transmitted to power shaft 21 and engagement shaft 44. Because the output shafts are no longer synchronized, the angular position of engagement shaft 44 with respect to ring 45 changes and pins 46 are forced into wing sections 50 of slots 49. Because ring 45 is axially fixed relative to the actuator, engagement shaft 44 shifts away from actuator arm 80 under action of pins 46 following the contours of slots 49. Actuator arm 80 is disengaged from the engagement shaft and is free to move rotationally.

If in the course of normal operation the external actuator load exceeds the maximum operating load of the actuator, the selection of transmission path gear ratios and the action of synchronizer 60 cause shafts 3 and 4 to maintain their fixed ratio of rotational speeds. Consequently, the angular position of ring 45 remains unchanged with respect to engagement shaft 44 and pins 46 remain in the cusp sections of slots 49. Thus, engagement shaft 44 remains engaged to actuator arm 80 when the actuator experiences an external overload or an external jam. The actuator does not enter fail-free mode in response to an external overload.

The fail-free quick release mechanism of the device shown in FIG. 5 can be readily tested and reset without having to contend with loose rollers or pins. With the assistance of position indicators, ring 45 and pins 46 can be returned to their normal operating positions through appropriate servo control of drive motors 1 and 2. It is not necessary to perform special maintenance on the quick release mechanism in order to reset the actuator for normal functionality.

Figure 9:
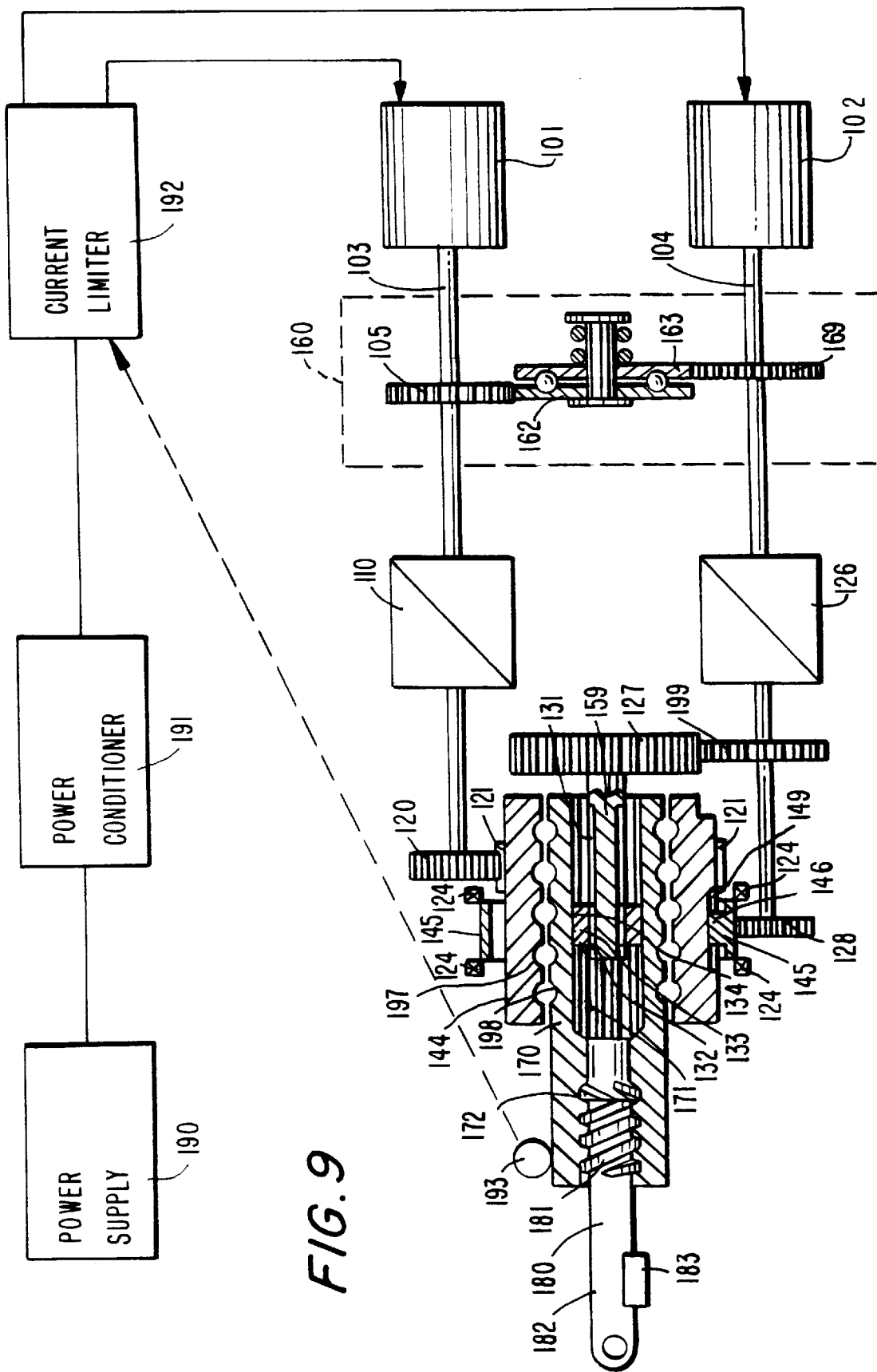
FIG. 9 is a schematic drawing of an illustrative embodiment of a linear fail-free actuator of the present invention.

FIG. 9 is a schematic drawing of another embodiment of the present invention. This particular embodiment produces a linear output, and similar to the embodiment shown in FIG. 5, this actuator enters the fail-free mode in response to an internal jam, and maintains engagement during an external overload. Two separate drive motors transmit rotation through two separate transmissions which combine their outputs in a differential screw-nut arrangement that produces a linear output. The actuator includes a quick release mechanism which acts upon the nut so that the nut is axially fixed during normal operation, and axially free during fail-free mode.

During normal operation of the actuator, drive motors 101 and 102 generate first and second rotary outputs, respectively, that may have different speeds; however, the ratio of the angular rates of rotation of the output shafts (when the drive motors are rotating) remains fixed. Output shaft 103 of drive motor 101 is connected to transmission 110 which includes standard reduction gearing and terminates in a nut drive gear 120. Nut drive gear 120 drives power ring 121 which imparts rotation to ball nut 144 through drive pins 122 (not shown in FIG. 9). Output shaft 104 of drive motor 102 is connected to transmission 126 which includes standard reduction gearing and terminates in gear 199. Gear 199 drives screw drive gear 127 and an axial support ring drive gear 128. Screw drive gear 127 drives power shaft 159 which has an external spline 131 that cooperates with an internal spline 132 of annular coupling 133 and permits axial movement between power shaft 159 and annular coupling 133. Annular coupling 133 has an external spline 134 which cooperates with an internal spline 171 of ball screw 170 and also permits axial movement between annular coupling 133 and ball screw 170. Ball screw 170 has an external thread 198 which cooperates with an internal thread 197 of ball nut 144 through interaction of ball bearings (not shown in FIG. 9) between the screw and nut. Thus, during normal operation of the actuator, ball nut 144 rotates at an angular rate of rotation resulting from the output of drive motor 101, and ball screw 170 rotates at an angular rate of rotation resulting from the output of drive motor 102.

Figure 10:
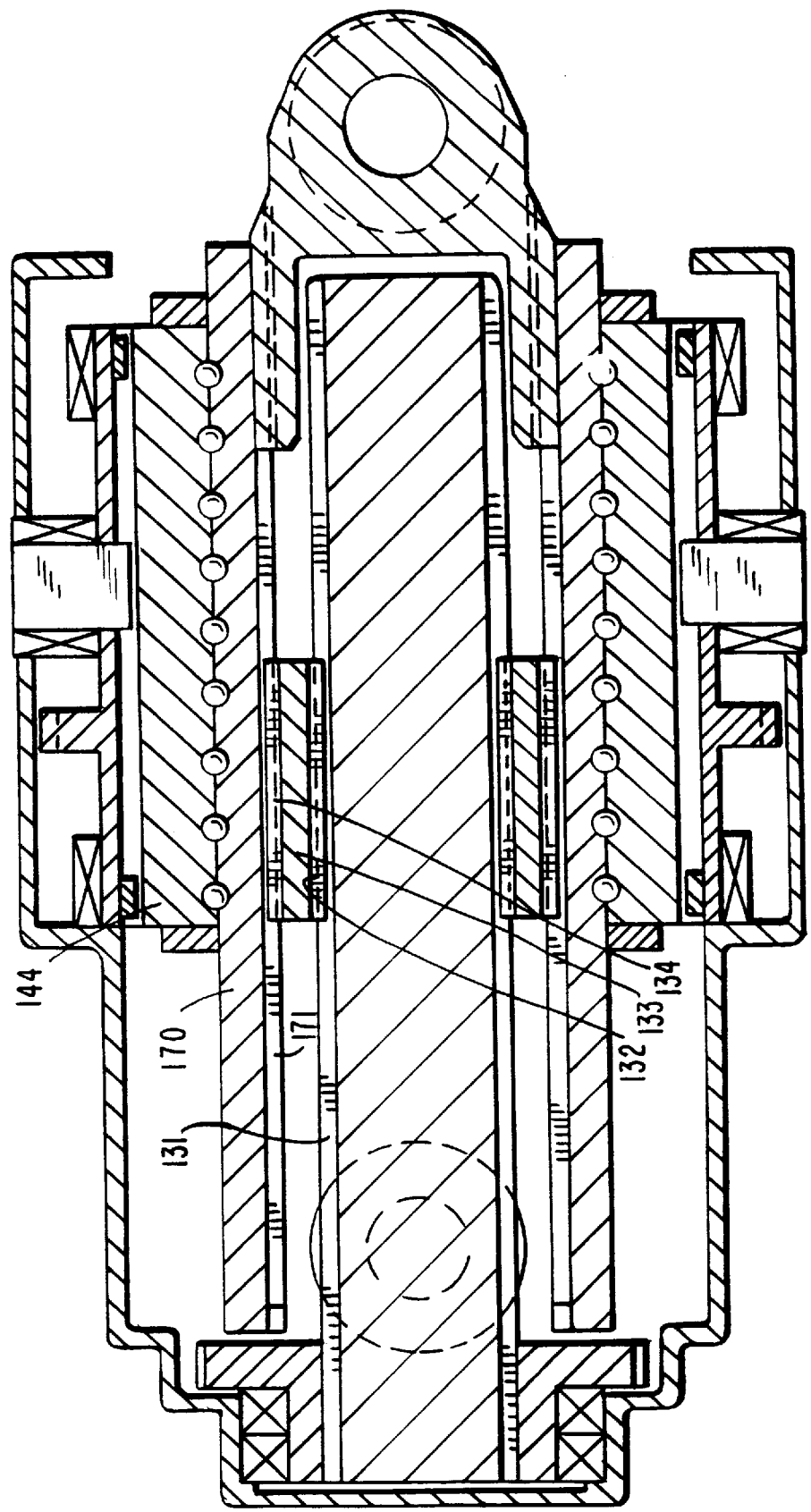
FIG. 10 is a cross-sectional view of the illustrative quick release mechanism and other associated driving components shown in FIG. 9.

FIG. 10 shows in greater detail annular coupling 133 and its interaction with surrounding components.

Referring back to FIG. 9, ball screw 170 and ball nut 144 interact to combine the transmission outputs associated with drive motors 101 and 102 and convert the rotary motion to linear motion. Ball screw 170 is connected to acme screw 180 which has an external thread 181 interacting with internal thread 172 on ball screw 170. Ball screw 170 and acme screw 180 may interact such that acme screw 180 retracts into or extends out of ball screw 170 when ball screw 170 extends from ball nut 144. Whether acme screw 180 retracts into or extends from ball screw 180 depends upon whether the designer wishes to utilize "aiding load" in the operation of the actuator. Acme screw 180 has an external load connection section 182 which includes an anti-rotation key 183. Anti-rotation key 183 prevents acme screw 180 from rotating in unison with ball screw 170.

As with the embodiment shown in FIG. 5, the linear fail-free actuator includes a synchronizer 160 that functions in the same way to accomplish the same results as synchronizer 60 in the rotary actuator. Gear 105 on output shaft 103 connects to gear 162. Gear 169 on output shaft 104 connects to gear 163. As described with respect to the rotary actuator, synchronizer 160 will release if the torque across the clutch mechanism exceeds a threshold level. In the alternative, synchronizer 160 may comprise any clutch release mechanism that maintains a synchronized phase relationship during normal operation and that has the appropriate torque threshold. Synchronizer 160 may comprise any clutch mechanism having the appropriate torque threshold.

Figure 11:
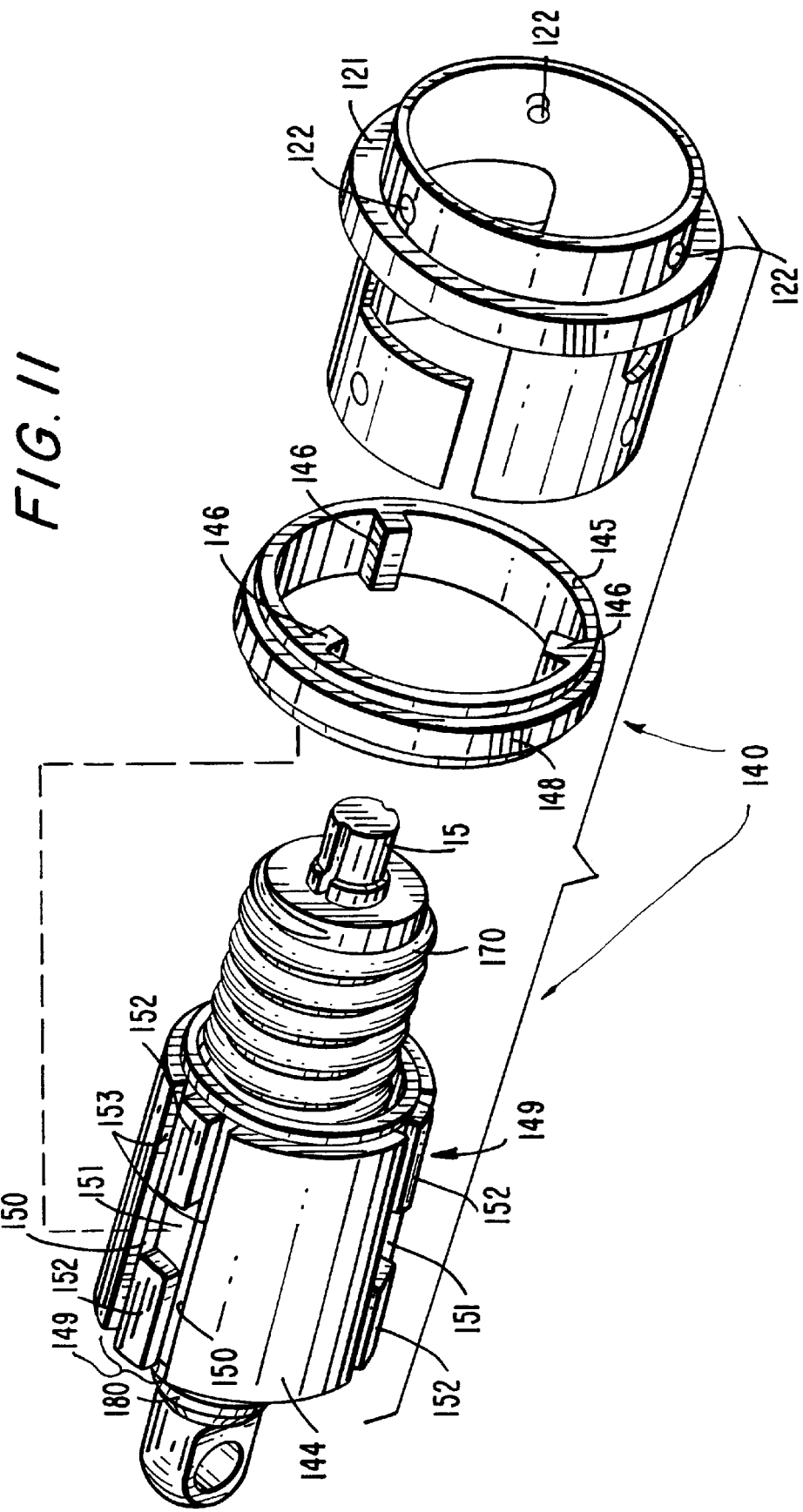
FIG. 11 is an exploded perspective view of the illustrative quick release mechanism of the device shown in FIG. 9.
Figure 12:
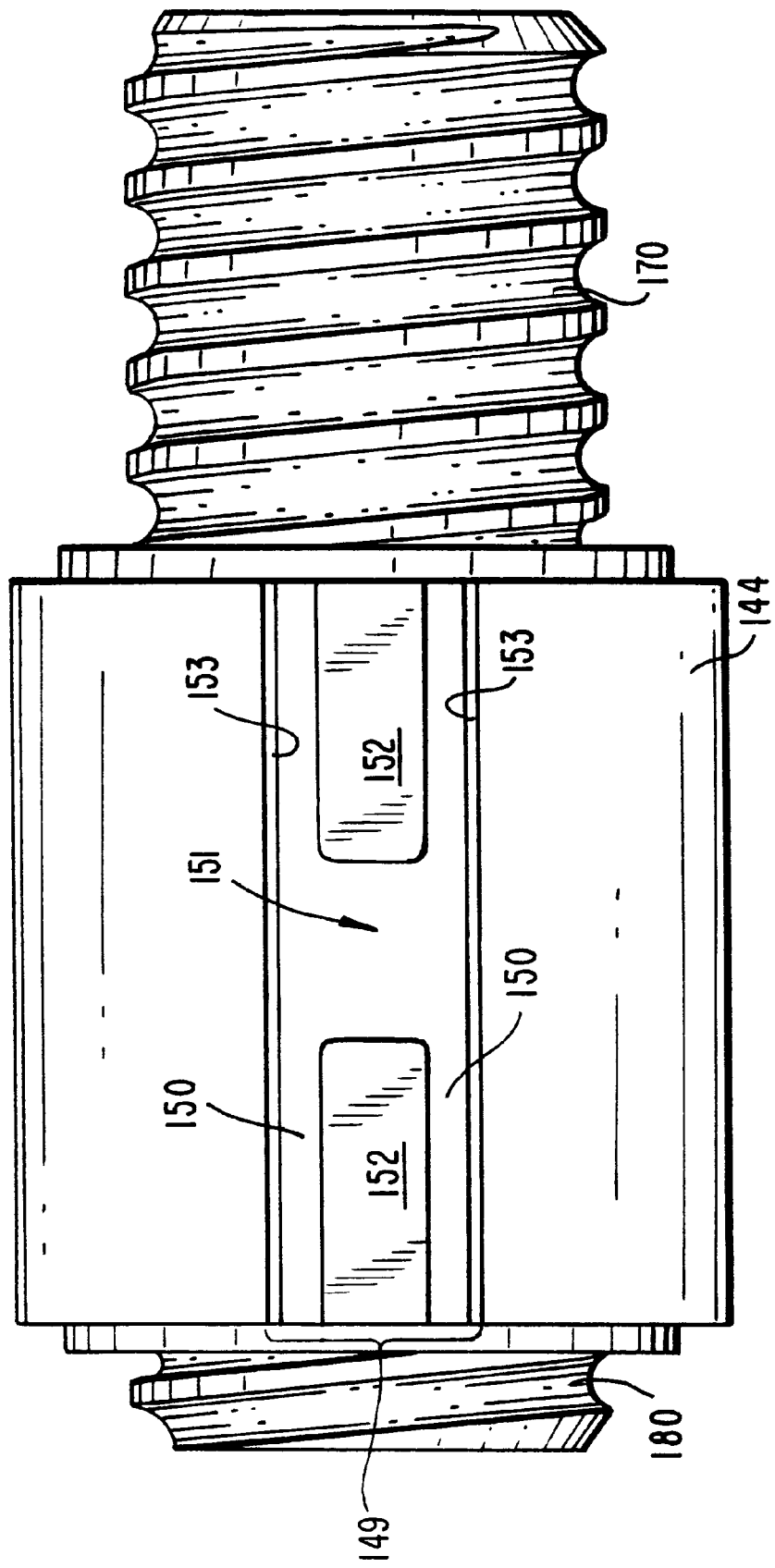
FIG. 12 is a side view of the illustrative ball nut, ball screw and acme screw shown in FIG. 9.
Figure 13:
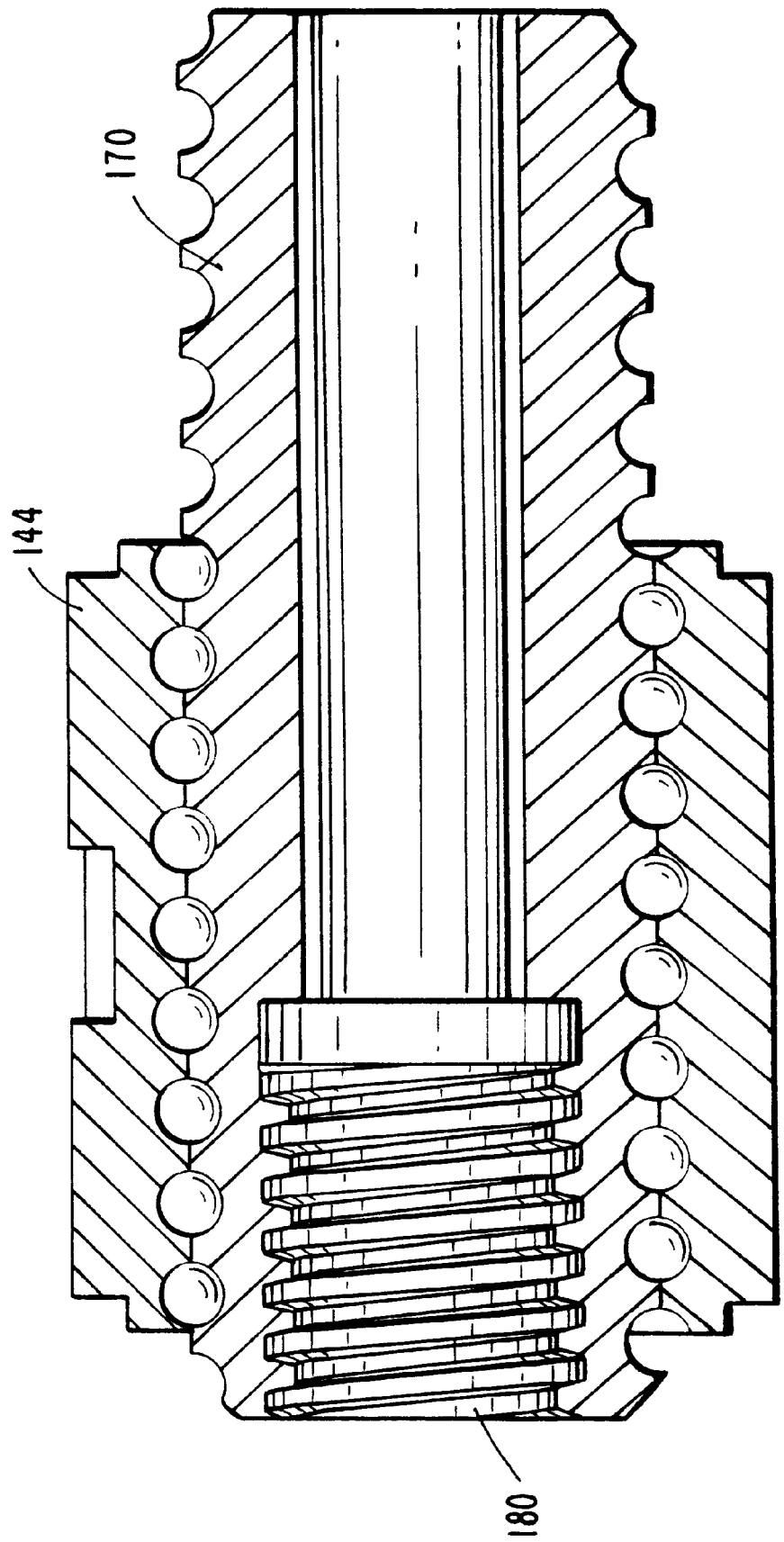
FIG. 13 is a cross-sectional view of the illustrative ball nut, ball screw and acme screw shown in FIG. 9.

FIG. 11 is an exploded perspective view of quick release mechanism 140, power ring 121 and acme screw 180 of the linear actuator of FIG. 9. Ball nut 144 includes an axial support interface that maintains the axial position of ball nut 144 during normal operation of the actuator. In this embodiment, the axial support interface includes three slots 149 on the outer face of ball nut 144, each slot 149 having two outer edges 153, two lugs 152, a space 151 located between lugs 152 and longitudinal slot sections 150 located along outer edges 153 and to the sides of lugs 152. FIG. 12 is a side view of ball nut 144 and ball screw 170, showing one of slots 149, longitudinal slot sections 150 and space 151 located between lugs 152 on ball nut 144. FIG. 13 is a cross-sectional view of ball nut 144, ball screw 170 and acme screw 180.

Referring back to FIGS. 9 and 11, axial support ring 145 has external teeth 148 that interact with axial ring drive gear 128 (which is connected to gear 199) such that axial support ring 145 rotates at the same rate as ball nut 144 during normal operation of the actuator and the angular positions of axial support ring 145 and ball nut 144 are operatively the same. Axial support ring 145 is axially supported in a fixed location with respect to the actuator by thrust bearings 124 and includes a ball nut supporter. The ball nut supporter comprises tangs 146 on axial support ring 145. Tangs 146 extend into slots 149 on ball nut 144. During normal actuator operation, axial support ring 145 maintains the same angular position as ball nut 144 (when stationary and when rotating) so that tangs 146 are positioned within spaces 151 located between lugs 152. As ball nut 144 exerts force on ball screw 170, tangs 146 react that force from ball nut lugs 152 to axial support ring 145 and thrust bearings 124. As a result, ball nut 144 maintains its axial position.

If an internal jam occurs in the actuator, an excess torque occurs across synchronizer 160 causing output shafts 103 and 104 to rotate independently of each other. Output shafts 103 and 104 no longer maintain their fixed angular rate of rotation relationship, and ball nut 144 and axial support ring 145 change angular positions with respect to each other.

When axial support ring 145 rotates ahead or behind ball nut 144 such that tangs 146 are aligned with longitudinal slot sections 150 (i.e., the angular positions of axial support ring 145 and ball nut 144 are operatively different), ball nut 144 is no longer supported by axial support ring 145. Drive pins 122 on power ring 121 also align with longitudinal slot sections 150. As a result, ball nut 144, ball screw 170 and acme screw 180 may shift axially under influence of the actuator load or a backup actuator attached to the load.

If an internal jam occurs at the contact between ball screw 170 and ball nut 144, it is necessary that one power path overpower the other power path so that the actuator does not simply slow down and stop when ball screw 170 binds to ball nut 144. Ball screw 170 and ball nut 144 must continue to rotate in unison so that tangs 146 of axial support ring 145 move into longitudinal slot sections 150 of ball nut 144 and the actuator enters fail-free mode. Thus, ball nut 144 and ball screw 170 contribute substantially different torques to the actuator output, ensuring that actuator ball nut/ball screw motion does not cease upon binding of those components, preventing the quick release mechanism from releasing the external actuator load.

Figure 14:
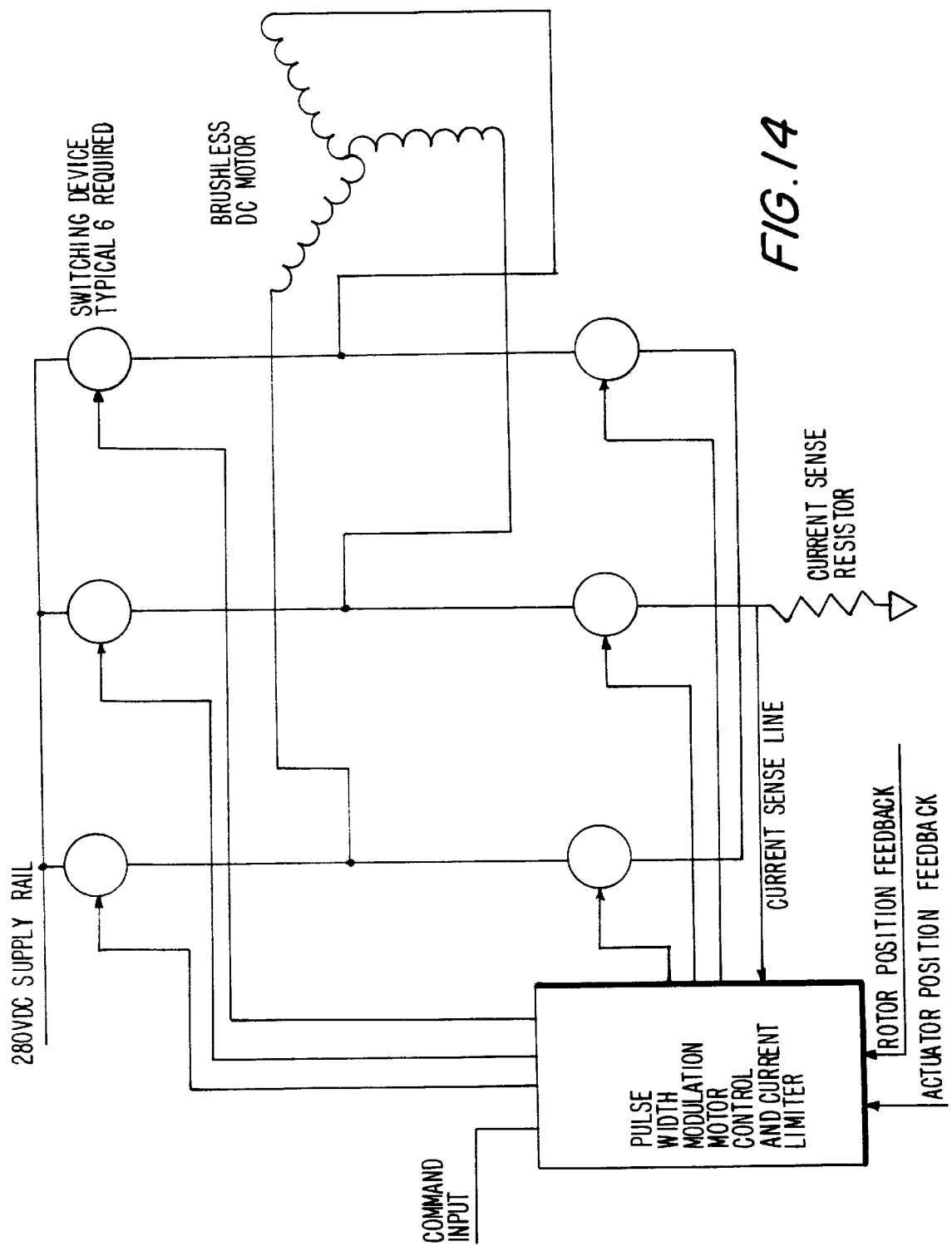
FIG. 14 is a schematic drawing of an illustrative embodiment of control circuitry used to power the actuator drive motors of the device shown in FIG. 9.

It is important to regulate the power supplied to drive motors 101 and 102 and to ensure that drive motors 101 and 102 are not damaged during operation of the actuator, particularly during an internal jam between ball nut 144 and ball screw 170. Generally, power supply 190 is connected to power conditioner 191 which is connected to controller current limiter 192. The actuator shown in FIG. 9 uses a bridge circuit to regulate current flow to drive motors 101 and 102. FIG. 14 is a schematic drawing of the control circuitry used to power drive motors 101 and 102. The bridge circuit includes a current limiter to sense current supplied to the drive motors and to turn off the bridge elements when the current has momentarily exceeded a set threshold. The current limiter has a timing circuit which turns it on again after a fixed period. This results in pulse width modulation. When one motor drives another backwards, the back EMF of the overpowered motor adds to the line voltage and the overpowered motor tries to draw even more current than it would if it were stalled, exceeding the set threshold. In this situation, the current limiter effectively turns the back-driven motor off, preventing damage.

Referring to FIGS. 9–13, in the case of an external jam, the linear actuator reacts in the same way as the rotary actuator, maintaining engagement with the external actuator load. It is important that the contribution to linear movement of the actuator load by ball screw 170 alone (i.e., ball nut remaining stationary) be greater than the contribution of acme screw 180 in the opposite direction. This ensures that when drive motor 101 stalls under heavy external loading, drive motor 102 (powering ball screw 170) does not continue rotating as a result of the acme screw 180 permitting the actuator load to move in the opposite direction of the advancing ball screw 170. Such a situation would cause the quick release mechanism to release the actuator load in response to an external overload. Rather, both drive motors 101 and 102 must cease rotating simultaneously during an external overload.

As with the embodiment shown in FIG. 5, the fail-free quick release mechanism of the device shown in FIG. 9 can be readily tested and reset without having to contend with loose rollers or pins. Through proper axial alignment of axial support ring 145 and ball nut 144, and with the assistance of position indicator 193, axial support ring 145 and ball nut 144 can be returned to their normal operating positions through appropriate servo control of drive motors 101 and 102.

It will be understood that the foregoing is only illustrative of the principles of the invention and that various modifications can be made by those skilled in the art without departing from the scope and spirit of the invention.

The invention claimed is:

1. A quick release mechanism comprising:

an engagement shaft for engaging an actuation member, said engagement shaft having an angular position defined by a first external rotation source; and an engagement shaft axial positioning mechanism having a ring supported for rotation in a fixed axial position and an axial shifter, said ring having an angular position defined by a second external rotation source, said ring also having an axial governor, wherein said axial governor interacts with said axial shifter to shift the axial position of said engagement shaft causing said engagement shaft to disengage said actuation member when said angular position of said engagement shaft and said angular position of said ring differ.

2. The apparatus defined in claim 1 wherein said axial governor interacts with said axial shifter to shift the axial position of said engagement shaft causing said engagement shaft to engage said actuation member when said angular position of said engagement shaft and said angular position of said ring are the same.

3. The apparatus defined in claim 1 wherein said first external rotation source includes a power shaft having an angular position and a coupling for transmitting rotation from said power shaft to said engagement shaft and permitting axial movement of said engagement shaft, and wherein said angular position of said engagement shaft is defined by said power shaft.

4. The apparatus defined in claim 1 wherein said first external rotation source includes a power shaft having an angular position and a coupling for transmitting rotation from said power shaft to said engagement shaft and permitting axial movement of said engagement shaft, wherein said angular position of said engagement shaft is defined by said power shaft, and wherein said axial governor interacts with said axial shifter to shift the axial position of said engagement shaft causing said engagement shaft to engage said actuation member when said angular position of said engagement shaft and said angular position of said ring are the same.

5. The apparatus defined in claim 1 wherein said first external rotation source includes a power shaft having an angular position and a diaphragm coupling for transmitting rotation from said power shaft to said engagement shaft and permitting axial movement of said engagement shaft, wherein said angular position of said engagement shaft is defined by said power shaft, wherein said engagement shaft has a face spline for engaging said actuation member and is coaxial with said power shaft, wherein said axial shifter comprises a plurality of pins rigidly attached to said engagement shaft and extending outward from said engagement shaft for axially positioning said engagement shaft, said apparatus further comprising a plurality of thrust bearings, and wherein in said ring is axially supported by said plurality of thrust bearings and said ring has external teeth for engagement with said second external rotation source, wherein said axial governor comprises a plurality of slots for receiving said plurality of pins, each said slot having a cusp section and two wing sections, said plurality of slots defining the axial position of said plurality of pins, wherein said plurality of slots forces said plurality of pins out of said cusp section of each of said slots into said wing section of each of said slots when said angular position of said engagement shaft differs from said angular position of said ring, shifting the axial position of said engagement shaft causing said face spline on said engagement shaft to disengage said actuation member, and wherein said plurality of slots forces said plurality of pins out of said wing section of each of said slots into said cusp section of each of said slots when said angular position of said engagement shaft approaches said angular position of said ring, shifting the axial position of said engagement shaft causing said face spline on said engagement shaft to engage said actuation member.

6. An actuator assembly for moving an external load comprising:

a first drive motor for producing a first rotary output;

a second drive motor for producing a second rotary output;

a synchronizer connected to said first rotary output and said second rotary output;

a first transmission path receiving said first rotary output and having a first transmission output;

a second transmission path receiving said second rotary output and having a second transmission output and a ring drive output;

a differential mechanism having a differential mechanism output, said differential mechanism output combining said first transmission output and said second transmission output;

an engagement shaft having an angular position defined by said differential mechanism output;

an actuation member for engagement with said engagement shaft, said engagement shaft transferring rotation from said differential mechanism output to said actuation member during normal operation; and an engagement shaft axial positioning mechanism having a ring supported for rotation in a fixed axial position and an axial shifter, said ring having an angular position defined by said ring drive output, said ring also having an axial governor, wherein said axial governor interacts with said axial shifter to shift the axial position of said engagement shaft causing said engagement shaft to disengage said actuation member when said angular position of said engagement shaft and said angular position of said ring differ.

7. The apparatus defined in claim 6 wherein said first drive motor for producing said first rotary output has a first angular rate of rotation, wherein said second drive motor for producing a second rotary output has a second angular rate of rotation, said first angular rate of rotation and said second angular rate of rotation having a ratio that is fixed at a normal operating ratio value when said drive motors are rotating during normal operation and having a ratio that is different from said normal operating ratio value when at least one of said drive motors is rotating during fail-free operation, and wherein said synchronizer maintains said normal operating ratio value when said drive motors are rotating during normal operation, said synchronizer transferring torque from one of said drive motors to the other of said drive motors when said torque is less than a predetermined threshold amount.

8. The apparatus defined in claim 6 wherein said first rotary output has a first angular rate of rotation, wherein said second rotary output has a second angular rate of rotation, said first angular rate of rotation and said second angular rate of rotation having a ratio that is fixed at a normal operating ratio value when said drive motors are rotating during normal operation and having a ratio that is different from said normal operating ratio value when at least one of said drive motors is rotating during fail-free operation, wherein said synchronizer has a clutch release mechanism connected to said first rotary output and said second rotary output for maintaining said normal operating ratio value when said drive motors are rotating during normal operation, said clutch release mechanism transferring torque from one of said drive motors to the other of said drive motors when said torque is less than a predetermined threshold amount, said torque exceeding said threshold amount in response to an internal actuator jam, said apparatus further comprising a planetary gear system for receiving said first transmission output and said second transmission output, said planetary gear system having at least one stage, said stage having at least one ring gear, at least one set of planet gears and at least one sun gear, said planetary gear system having a planetary gear system output, said planetary gear system combining said first transmission output with said second transmission output, said apparatus further comprising a power shaft connected to said planetary gear system output, wherein said angular position of said engagement shaft is defined by said power shaft, wherein said engagement shaft has a face spline for engaging said actuation member and said engagement shaft is coaxial with said power shaft, wherein said axial shifter comprises a plurality of pins rigidly attached to said engagement shaft and extending outward from said engagement shaft for axially positioning said engagement shaft, said apparatus further comprising a diaphragm coupling for transmitting rotation from said power shaft to said engagement shaft and permitting axial movement of said engagement shaft in response to axial movement of said pins, said apparatus further comprising a plurality of thrust bearings, wherein in said ring is axially supported by said plurality of thrust bearings and said ring has external teeth for engagement with said second external rotation source, wherein said axial governor comprises a plurality of slots for receiving said plurality of pins, each said slot having a cusp section and two wing sections, said plurality of slots defining the axial position of said plurality of pins, wherein said plurality of slots forces said plurality of pins out of said cusp section of each of said slots into said wing section of each of said slots when said angular position of said engagement shaft differs from said angular position of said ring, shifting the axial position of said engagement shaft causing said face spline on said engagement shaft to disengage said actuation member, and wherein said plurality of slots forces said plurality of pins out of said wing section of each of said slots into said cusp section of each of said slots when said angular position of said engagement shaft approaches said angular position of said ring, shifting the axial position of said engagement shaft causing said face spline on said engagement shaft to engage said actuation member.

9. A quick release mechanism comprising:

a ball nut having an axial support interface and an angular position; and an axial support ring supported for rotation in a fixed axial position, said axial support ring having an angular position and a ball nut supporter, wherein said ball nut supporter provides axial support for said ball nut when said angular position of said ball nut and said angular position of said axial support ring are operatively the same; and wherein said ball nut supporter permits axial movement of said ball nut when said angular position of said ball nut and said angular position of said axial support ring are operatively different.

10. The apparatus defined by claim 9 wherein said angular position of said ball nut corresponds to an output of a first rotation source, and said angular position of said axial support ring corresponds to an output of a second rotation source.

11. The apparatus defined by claim 9 wherein said angular position of said ball nut corresponds to an output of a first rotation source, wherein said angular position of said axial support ring corresponds to an output of a second rotation source, wherein said axial support interface comprises a plurality of slots, each said slot having outer edges and a plurality of lugs positioned between said outer edges, each said slot having a space between said lugs positioned within each said slot and each said slot having longitudinal slot sections between said outer edges and said lugs, said apparatus further comprising a plurality of thrust bearings for supporting said axial support ring in said fixed axial position, wherein said axial support ring has external teeth communicating with said second rotation source, and wherein said ball nut supporter comprises a plurality of tangs extending inward toward said ball nut, wherein said plurality of tangs is positioned within said spaces between said lugs in said plurality of slots of said axial support interface when said angular position of said ball nut and said angular position of said axial support ring are operatively the same, wherein said plurality of tangs is positioned within said longitudinal slot sections of said plurality of slots of said ball nut when said angular position of said ball nut and said angular position of said axial support ring are operatively different.

12. An actuator assembly for moving an external load comprising:

a first drive motor for producing a first rotary output;

a second drive motor for producing a second rotary output;

a synchronizer connected to said first rotary output and said second rotary output;

a first transmission for receiving said first rotary output and having a first transmission output;

a second transmission for receiving said second rotary output and having a second transmission output and a ring drive output;

a ball nut having an angular position, an angular rate of rotation and an axial support interface, said angular position of said ball nut corresponding to said first transmission output;

a ball screw for converting rotation of said ball nut and rotation of said second transmission output to linear movement, said ball screw having an angular rate of rotation, said angular rate of rotation of said ball screw being different than said angular rate of rotation of said ball nut during normal operation when said first drive motor and said second drive motor are rotating;

an axial support ring supported for rotation in a fixed axial position, said axial support ring having an angular position corresponding to said ring drive output and a ball nut supporter, wherein said ball nut supporter provides axial support for said ball nut when said angular position of said ball nut and said angular position of said axial support ring are operatively the same; and wherein said ball nut supporter permits axial movement of said ball nut when said angular position of said ball nut and said angular position of said axial support ring are operatively different; and a control system for providing electrical power to said drive motors.

13. The apparatus defined in claim 12 further comprising a power ring for receiving said first transmission output, said power ring transmitting rotation to said ball nut while permitting axial movement of said ball nut, said power ring having a plurality of drive pins extending inward for engagement with said plurality of slots in said ball nut, wherein said angular position of said ball nut corresponds to an angular position of said power ring, wherein said first rotary output has a first angular rate of rotation, wherein said second rotary output has a second angular rate of rotation, wherein the ratio formed by said first angular rate of rotation and said second angular rate of rotation is fixed at a normal operating ratio value when said drive motors are rotating during normal operation, wherein said ratio differs from said normal operating ratio value when at least one of said drive motors is rotating during fail-free operation, wherein said synchronizer has a clutch release mechanism connected to said first rotary output and said second rotary output for maintaining said normal operating ratio value when said drive motors are rotating during normal operation, said clutch release mechanism transferring torque from one of said drive motors to the other of said drive motors when said torque is less than a predetermined threshold amount, said torque exceeding said threshold amount in response to an internal actuator jam, said apparatus further comprising a screw drive shaft having an external spline, an annular coupling having an external spline and an internal spline engaging said external spline of said screw drive shaft, wherein said ball screw has an external thread, an internal spline in a screw drive section, and an internal thread at an acme screw section, said internal spline engaging said external spline of said annular coupling, wherein said ball nut further comprises an internal thread engaging said external thread of said ball screw, wherein said axial support interface comprises a plurality of slots, each said slot having outer edges and a plurality of lugs positioned between said outer edges, each said slot having a space between said lugs positioned within each said slot and each said slot having longitudinal slot sections between said outer edges and said lugs, wherein said axial support ring further comprising external teeth for engagement with said ring drive output, said apparatus further comprising a plurality of thrust bearings, wherein said axial support ring is axially supported for rotation by said thrust bearings, wherein said ball nut supporter comprises a plurality of tangs extending inward toward said ball nut, wherein said plurality of tangs is positioned within said spaces between said lugs in said plurality of slots of said axial support interface when said angular position of said ball nut and said angular position of said axial support ring are operatively the same, wherein said plurality of tangs is positioned within said longitudinal slot sections of said plurality of slots of said ball nut when said angular position of said ball nut and said angular position of said axial support ring are operatively different, and said apparatus further comprising an acme screw having an anti-rotation mechanism and an external thread engaging said internal thread of said ball screw such that said acme screw subtracts less than the contribution of the ball screw to the linear output of the actuator, said acme screw and said ball screw transmitting a controlled linear output to said external load during normal operation and said acme screw, said ball screw and said ball nut being axially free during fail-free operation, wherein said acme screw transmits a controlled linear output to said external load during normal operation, said normal operation occurring when said torque across said synchronizer is less than said predetermined threshold amount, and wherein said acme screw, said ball screw and said ball nut are axially free during fail-free operation, said fail-free operation occurring when said torque across said synchronizer exceeds said predetermined threshold amount.

14. An actuator assembly for moving an external load comprising:

a plurality of drive motors;

a synchronizer connected to said drive motors;

a transmission connected to said drive motors; and a quick release mechanism connected to said transmission, said quick release mechanism releasing support of said external load in response to an internal actuator jam and maintaining support of said external actuator load in response to an external actuator overload.

* * * * *